“3,278,556
Patented Oct. 11, 1966”

3,278,556
SYNTHESIS OF STEROIDS
Patrick Andrew Diassi, Westfield, N.J., assignor, by mesne assignments, to E. R. Squibb & Sons, Inc., New York, N.Y., a corporation of Delaware
No Drawing. Filed Feb. 3, 1964, Ser. No. 342,263
3 Claims. (Cl. 260—343.2)

This invention relates to the provision of novel physiologically active compounds and more particularly to compounds of the formula

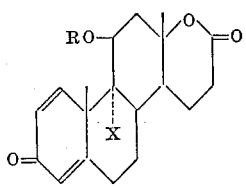

wherein R is selected from the group consisting of hydrogen and acyl; and X is selected from the group consisting of hydrogen and halogen (e.g., chloro and fluoro).

The preferred acyl radicals of this invention are those of hydrocarbon carboxylic acids of less than twelve carbon atoms, each exemplified by the lower alkanoic acids (e.g., acetic, propionic, butyric and tert-pentanoic acid), the lower alkanoic acids, the monocyclic aryl acids (e.g., benzoic and toluic acids), the monocyclic aryl lower alkanoic acids (e.g., phenacetic and β-phenylpropionic acid), the cycloalkane carboxylic acids and the cycloalkene carboxylic acids.

The compounds of this invention are physiologically active substances which possess protein anabolic activity and may be used in teh treatment of underweight patients, for example, to effect the rapid build-up of protein stores; the dosage and/or concentration being adjusted for the relative potency of the particular compounds employed.

The compounds of this invention are prepared according to the novel processes of this invention beginning with 11-keto-$\Delta^1$-dehydrotestololactone and 9α-halo-11-keto-$\Delta^1$-dehydrotestololactone as starting materials. The 9α-halo starting materials may be prepared as described in Example 2, step (a), hereinafter.

In the first step of the process of this invention, the 11-keto-$\Delta^1$-dehydrotestololactone or 9α-halo analog thereof is reduced as by treatment with lithium tri-t-butoxy aluminum hydride to yield the respective 11β-hydroxy-$\Delta^1$-dehydrotestololactone.

The invention may be further illustrated by the following examples:

EXAMPLE I

*11β-hydroxy-$\Delta^1$-dehydrotestololactone*

To a solution of 170 mg. of 11-keto-$\Delta^1$-dehydrotestololactone in 25 ml. of tetrahydrofuran, freshly distilled from lithium aluminum hydride, 340 mg. of lithium tri-t-butoxy aluminum hydride are added and the mixture stirred under nitrogen at room temperature for twenty-four hours. The reaction mixture is then carefully diluted with 50 ml. of 10% acetic acid and extracted with chloroform. The chloroform extracts are washed with water, dried over sodium sulfate, and exaporated to dryness. Crystallization of the residue from methanol gives 136 mg. of 11β-hydroxy-$\Delta^1$-dehydrotestololactone having a melting point 238–240°, $[\alpha]_D^{22}$ —37°. (chf.);

$\lambda_{max.}^{alc.}$ 241 m$\mu$ ($\epsilon$ 17,200)

*Analysis.*—Calc'd for $C_{19}H_{24}O_4$ (316.38): C, 72.12; H, 7.65. Found: C, 72.03; H, 7.79.

EXAMPLE 2

(a) *9α-fluoro-11-keto-$\Delta^1$-dehydrotestololactone*

Surface growth from a three-week old agar slant culture of *Cylindrocarpon radicicola* (ATCC 11011), the slant containing as a nutrient medium (A): glucose, 10 g.; Difco yeast extract, 2.5 g. $K_2HPO_4$, 1 g.; agar, 20 g.; and distilled water to 1 l., is suspended in 2.5 ml. of a 0.01% sodium lauryl sulfate aqueous solution. One milliliter portions of the suspension are used to inoculate two 250 ml. conical flasks, each containing 50 ml. of the following sterilized nutrient medium (B): dextrose, 10 g.; cornsteep liquor, 6 g.; $NH_4H_2PO_4$, 3 g.; Difco yeast extract, 2.5 g.; $CaCl_2$, 2.5; and distilled water to 1 l. After forty-eight hours of incubation at 25° with continuous rotary agitation (280 cycles per minute, 2 inch radius), 10% (vol./vol.) transfers are made to twelve 250 ml. conical flasks each containing 50 ml. of fresh sterilized medium B. There are incubated under the conditions described above for twenty-four hours, after which another 10% (vol./vol.) transfer is made to 100 additional 250 ml. flasks containing 50 ml. of fresh sterilized medium B. The 9α-fluoro-11-ketoprogresterone is added to each flask 0.25 ml. of a sterile solution of the steroid in in N,N-dimethylformamide (60 mg./ml.) so that the medium is supplemented with 300 $\mu$g/ml. of steroid. After forty-eight hours of further incubation, the contents of the flasks are pooled and filtered through a Seitz clarifying pad. The flasks, mycelium and pad are washed with successive 50 ml. portions of warm water. The combined filtrate and washings (pH 8.2) are acidified to pH 4 with acetic acid and extracted three times with 2.1 portions of chloroform. The combined chloroform extracts are then washed twice with 3 l. portions of water and evaporated to dryness, in vacuo. The residue is redissolved in 200 ml. of ethyl acetate and extracted with 2×100 ml. portions of 5% sodium bicarbonate. The ethyl acetate is then washed with water, dried over sodium sulfate and evaporated to dryness, in vacuo. Crystallization of the residue from acetone-hexane gives about 100 mg. of 9α-fluoro-11-keto-$\Delta^1$-dehydrotestololactone.

(b) *9 -fluoro-11β-hydroxy-$\Delta^1$-dehydrotestolactone*

Following the procedure of Example 1 but substituting 9α-fluoro-11-ketone-$\Delta^1$-dehydrotestololactone for 11-keto-$\Delta^1$-dehydrotestololactone there is obtained 9α-fluoro-11β-hydroxy-$\Delta^1$-dehydrotestololactone having M.P. 275–277°, $[\alpha]_D^{22}$ —12° (chf.), $\lambda_{max.}^{alc.}$ 236 m$\mu$ ($\epsilon$ 15,700)

*Analysis.*—Calc'd for $C_{19}H_{23}O_4F$ (334.37): C, 68.24; H, 6.93. Found: C, 67.96; H, 7.22.

EXAMPLE 3

*9α-chloro-11β-hydroxy-$\Delta^1$-dehydrotestololactone*

Following the procedure of Example 1 but substituting 9α-chloro-11-keto-$\Delta^1$-dehydrotestololactone (prepared by replacing the 9α-fluoro-11-ketoprogesterone in Example 1, step (a), by 9α-chloro-11-ketoprogesterone) for 11-keto-$\Delta^1$-dehydrotestololactone there is obtained 9α-chloro-11β-hydroxy-$\Delta^1$-dehydrotestololactone.

EXAMPLE 4

*11β-hydroxy-$\Delta^1$-dehydrotestololactone-11-acetate*

A solution of 11β-hydroxy-$\Delta^1$-dehydrotestololactone in anhydrous pyridine and acetic anhydride is allowed to stand at room temperature overnight. Removal of the reagents in vacuo leaves a residue which on crystallization from methanol furnishes the pure 11β-hydroxy-$\Delta^1$ dehydrotestololactone-11-acetate.

Similarly, each of the acylating agents such as propionic anhydride, butyric anhydride and benzoyl chloride are substituted for the acetic anhydride in the procedure of Example 4 and the corresponding 11-substituted compounds are formed.

Similarly, substituting the 9-halo analog of 11β-hydroxy-Δ¹- testololactone for 11β-hydroxy-Δ¹-dehydrotestololactone in the procedure of Example 4 there is obtained the corresponding 9-halo-11-acetate.

The invention may be variously otherwise embodied within the scope of the appended claims.

What is claimed is:

1. A compound of the formula

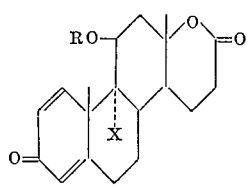

wherein R is selected from the group consisting of hydrogen and acyl, wherein the acyl is a hydrocarbon carboxylic acid of less than twelve carbon atoms; and X is halogen.

2. 9α-fluoro-11β-hydroxy-Δ¹-dehydrotestololactone.
3. 9α-chloro-11β-hydroxy-Δ¹-dehydrotestololactone.

References Cited by the Examiner

UNITED STATES PATENTS

| | | | |
|---|---|---|---|
| 2,806,038 | 9/1957 | Picha | 260—343.2 |
| 2,823,171 | 2/1958 | Fried et al. | 195—51 |
| 2,837,464 | 6/1958 | Nobile | 195—51 |
| 2,946,807 | 7/1960 | Fried et al. | 260—343.2 |
| 3,174,982 | 3/1965 | Diassi et al. | 260—343.2 |
| 3,179,658 | 4/1965 | Hirschmann et al. | 260—239.55 |

FOREIGN PATENTS 792,803  4/1958  Great Britain.

OTHER REFERENCES

Fried et al.: Recent Progress in Hormone Research, vol. II (1955), pages 168, 169, 172 and 174.

WALTER A. MODANCE, *Primary Examiner.*

JAMES A. PATTEN, *Assistant Examiner.*